(12) United States Patent
Palmas et al.

(10) Patent No.: US 8,173,567 B2
(45) Date of Patent: *May 8, 2012

(54) PROCESS FOR REGENERATING CATALYST

(75) Inventors: Paolo Palmas, Des Plaines, IL (US);
Lawrence A. Lacijan, Palatine, IL (US);
Sujay R. Krishnamurthy, Hoffman Estates, IL (US); Mohammad-Reza Mostofi-Ashtiani, Naperville, IL (US);
Paul S. Nishimura, Arlington Heights, IL (US); Lisa M. Wolschlag, Aurora, IL (US)

(73) Assignee: UOP LLC, Des Plaines, IL (US)

( * ) Notice: Subject to any disclaimer, the term of this patent is extended or adjusted under 35 U.S.C. 154(b) by 549 days.

This patent is subject to a terminal disclaimer.

(21) Appl. No.: 12/335,593

(22) Filed: Dec. 16, 2008

(65) Prior Publication Data
US 2010/0152020 A1 Jun. 17, 2010

(51) Int. Cl.
*B01J 38/30* (2006.01)
(52) U.S. Cl. ........... 502/41; 502/21; 502/34; 502/39; 502/37; 502/45; 502/52; 502/35; 502/48; 502/49; 502/46; 422/220; 422/218; 422/219; 422/223; 422/239; 422/144; 422/143; 422/145; 422/310; 208/161; 208/121; 208/164; 208/113; 208/140

(58) Field of Classification Search .............. None
See application file for complete search history.

(56) References Cited

U.S. PATENT DOCUMENTS

| | | | |
|---|---|---|---|
| 3,974,091 A | 8/1976 | Parker et al. | |
| 4,150,090 A * | 4/1979 | Murphy et al. | 422/144 |
| 4,364,905 A | 12/1982 | Fahrig et al. | |
| 4,615,992 A | 10/1986 | Murphy | |
| 4,843,050 A * | 6/1989 | Rahlwes et al. | 502/41 |
| 4,859,643 A * | 8/1989 | Sechrist et al. | 502/37 |
| 4,880,604 A * | 11/1989 | Koves | 422/220 |
| 5,156,817 A | 10/1992 | Luckenbach | |
| 5,773,378 A * | 6/1998 | Bussey et al. | 502/41 |
| 6,503,460 B1 | 1/2003 | Miller et al. | |
| 6,558,531 B2 | 5/2003 | Steffens et al. | |
| 6,809,054 B1 * | 10/2004 | Myers et al. | 502/41 |
| 7,026,262 B1 * | 4/2006 | Palmas et al. | 502/41 |
| 7,087,154 B2 | 8/2006 | Pinho et al. | |
| 7,368,090 B2 | 5/2008 | Myers et al. | |
| 2007/0248506 A1 | 10/2007 | Chen et al. | |
| 2008/0152563 A1 | 6/2008 | Hedrick et al. | |

FOREIGN PATENT DOCUMENTS

| | | |
|---|---|---|
| CN | 1519296 A | 8/2004 |
| CN | 1208433 | 6/2005 |
| EP | 0 309 244 | 3/1989 |

(Continued)

OTHER PUBLICATIONS

Wilson, Joseph W., "FCC Revamp Improves Operations at Australian Refinery", Oil & Gas Journal, Oct. 25, 1999, pp. 63-67.

(Continued)

*Primary Examiner* — Melvin C Mayes
*Assistant Examiner* — Smita Patel
(74) *Attorney, Agent, or Firm* — James C Paschall

(57) ABSTRACT

Disclosed is a catalyst distributor and process for spreading catalyst over a regenerator vessel. Nozzles disposed angular to a header of the distributor spread catalyst throughout a full cross section of the catalyst bed.

16 Claims, 5 Drawing Sheets

FOREIGN PATENT DOCUMENTS

WO    WO 2007/094770 A1    8/2007

OTHER PUBLICATIONS

Schwarz, M. Philip, Reactive CFD Simulation of an FCC Regenerator, Asia-Pac., J. Chem. Eng. 2007: 2: 347-354.

Kou, S., "Running Optimizationof FCCU with Stacked Two-sgage Catalyst Regeneration", Petroleum Refinery Engineering 29(11) 1999 p. -146, Chinese, Abstract only.

Wilson, Joseph W., "FCC Revamp for Improved Operation", Amer. Chemical Society, New Orleans, LA. Aug. 1999, pp. 527-533.

Wilson. Joseph W., Design and Operation of Fluid Catalytic Cracking Unit Regenerators, AIChE 1999 Spring National Mtg., Houston, TX., Mar. 1999.

Miller, R.B., "Solutions for Reducing NOx and Particulate Emissions from FCC Regenerators" NPRA Annual Mtg, San Antonio, TX, 2004, pp. 1-14.

Wilson, Joseph W., "FCC Revamp for Improved Operation", NPRA annual mtg., Mar. 21-23, 1999, San Antonio, TX, pp. 1-23.

Bienstock, M., "Refining Details Notebook/Catalytic Cracking", Today's Refinery, Jan. 1994, V. 7, No. 10.

\* cited by examiner

PROCESS FOR REGENERATING CATALYST

BACKGROUND OF THE INVENTION

The field of the invention is the distribution of catalyst in a catalyst regenerator vessel.

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke is deposited on the catalyst. A high temperature regeneration operation within a regenerator zone combusts coke from the catalyst. Coke-containing catalyst, referred to herein as coked catalyst, is continually removed from the reaction zone and replaced by essentially coke-free catalyst from the regeneration zone. Fluidization of the catalyst particles by various gaseous streams allows the transport of catalyst between the reaction zone and regeneration zone.

A common objective of these configurations is maximizing product yield from the reactor while minimizing operating and equipment costs. Optimization of feedstock conversion ordinarily requires essentially complete removal of coke from the catalyst. This essentially complete removal of coke from catalyst is often referred to as complete regeneration. Complete regeneration produces a catalyst having less than 0.1 and preferably less than 0.05 wt-% coke. In order to obtain complete regeneration, the catalyst has to be in contact with oxygen for sufficient residence time to permit thorough combustion.

Conventional regenerators typically include a vessel having a coked catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator vessel.

There are several types of catalyst regenerators in use today. The conventional bubbling bed regenerator typically has just one chamber in which air is bubbled through a dense catalyst bed. Coked catalyst is added and regenerated catalyst is withdrawn from the same dense catalyst bed. Relatively little catalyst is entrained in the combustion gas exiting the dense bed. Two-stage bubbling beds have two chambers. Coked catalyst is added to a dense bed in a first chamber and is partially regenerated with air. The partially regenerated catalyst is transported to a dense bed in a second chamber and completely regenerated with air. The completely regenerated catalyst is withdrawn from the second chamber.

Complete catalyst regeneration can be performed in a dilute phase fast fluidized combustion regenerator. Coked catalyst is added to a lower chamber and is transported upwardly by air under fast fluidized flow conditions while completely regenerating the catalyst. The regenerated catalyst is separated from the flue gas by a primary separator upon entering into an upper chamber from which regenerated catalyst and flue gas is removed. U.S. Pat. Nos. 4,197,189 and 4,336,160 teach a riser combustion zone in which fast fluidized flow conditions are maintained to effect complete combustion without the need for the additional combustion in the catalyst bed collected from the top of the riser.

Oxides of nitrogen ($NO_x$) are usually present in regenerator flue gases but should be minimized because of environmental concerns. Production of $NO_x$ is undesirable because it reacts with volatile organic chemicals and sunlight to form ozone. Regulated $NO_x$ emissions generally include nitric oxide (NO) and nitrogen dioxide ($NO_2$), but the FCC process can also produce $N_2O$. In an FCC regenerator, $NO_x$ is produced almost entirely by oxidation of nitrogen compounds originating in the FCC feedstock and accumulating in the coked catalyst. At FCC regenerator operating conditions, there is negligible $NO_x$ production associated with oxidation of $N_2$ from the combustion air. Low excess air in the regenerator is often used by refiners to keep $NO_x$ emissions low.

After burn is a phenomenon that occurs when hot flue gas that has been separated from regenerated catalyst contains carbon monoxide that combusts to carbon dioxide. The catalyst that serves as a heat sink no longer can absorb the heat thus subjecting surrounding equipment to higher temperatures and perhaps creating an atmosphere conducive to the generation of nitrous oxides. Incomplete combustion to carbon dioxide can result from poor fluidization or aeration of the coked catalyst in the regenerator vessel or poor distribution of coked catalyst into the regenerator vessel.

To avoid after burn, many refiners have carbon monoxide promoter (CO promoter) metal such as costly platinum added to the FCC catalyst to promote the complete combustion to carbon dioxide before separation of the flue gas from the catalyst at the low excess oxygen required to control $NO_x$ at low levels. While low excess oxygen reduces $NO_x$, the simultaneous use of CO promoter often needed for after burn control can more than offset the advantage of low excess oxygen. The CO promoter decreases CO emissions but increases $NO_x$ emissions in the regenerator flue gas.

On the other hand, many refiners use high levels of CO promoter and high levels of excess oxygen to accelerate combustion and reduce afterburning in the regenerator, especially when operating at high throughputs. These practices may increase $NO_x$ by up to 10-fold from the 10-30 ppm possible when no platinum CO promoter is used and excess $O_2$ is controlled below 0.5 vol-%.

Improved methods are sought for preventing after burn and generation of nitrous oxides. Thorough mixing of catalyst and combustion gas in a regenerator promotes more uniform temperatures and catalyst activity fostering more efficient combustion of coke from catalyst.

SUMMARY OF THE INVENTION

We have discovered an apparatus and process for distributing coked catalyst to a regenerator vessel that spreads catalyst out in the catalyst bed of the regenerator to equalize temperatures in the bed. The more uniform temperatures in the dense bed promote a more uniform exposure of coked catalyst to oxygen resulting in higher regeneration efficiency. The regeneration is also more predictable and thus controllable to complete combustion to carbon dioxide without the need for a CO promoter to prevent after burn. Without after burn and CO promoter, less nitrous oxide is generated in the flue gas.

The catalyst distributor comprises a header having a longitudinal axis and an angular nozzle in communication with the header. The nozzle defines an acute angle with the longitudinal axis and discharges catalyst angularly from the header into the regenerator vessel. In an embodiment, a bottom of the nozzle is disposed in a bottom quarter of the header. In an additional embodiment, the nozzle discharges the catalyst horizontally. In a further embodiment, the catalyst distributor is submerged in the catalyst bed.

DETAILED DESCRIPTION OF THE INVENTION

Figure 1:
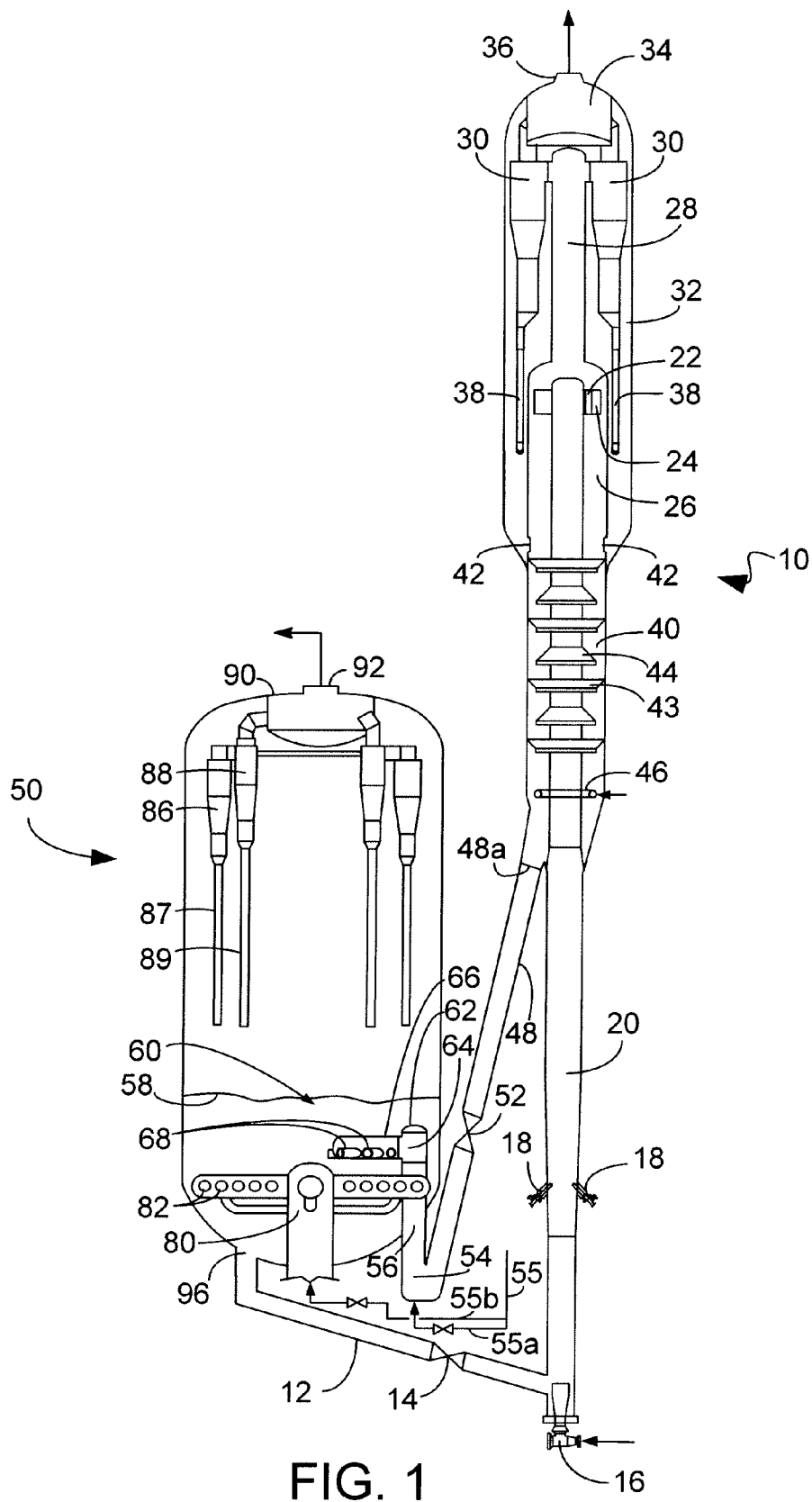
FIG. 1 is a schematic, elevational view of an FCC unit incorporating the present invention.

Although other uses are contemplated, the process and apparatus of the present invention may be embodied in an FCC unit. FIG. 1 shows an FCC unit that includes a reactor section 10 and a regenerator vessel 50. A regenerated catalyst conduit 12 transfers regenerated catalyst from the regenerator vessel 50 at a rate regulated by a control valve 14 to a riser 20 of the reactor section 10. A fluidization medium such as steam from a nozzle 16 transports regenerated catalyst upwardly through the riser 20 at a relatively high density until a plurality of feed injection nozzles 18 inject hydrocarbon feed across the flowing stream of catalyst particles. The catalyst contacts the hydrocarbon feed cracking it to produce smaller, cracked hydrocarbon products while depositing coke on the catalyst to produce coked catalyst.

A conventional FCC feedstock or higher boiling hydrocarbon feedstock are suitable feeds. The most common of such conventional feedstocks is a "vacuum gas oil" (VGO), which is typically a hydrocarbon material having a boiling range of from 343 to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive.

The resulting mixture continues upwardly through the riser 20 to a top at which a plurality of disengaging arms 22 tangentially and horizontally discharge the mixture of gas and catalyst from a top of the riser 20 through ports 24 into a disengaging vessel 26 that effects separation of gases from the catalyst. A transport conduit 28 carries the hydrocarbon vapors, including stripped hydrocarbons, stripping media and entrained catalyst to one or more cyclones 30 in a reactor vessel 32 which separates coked catalyst from the hydrocarbon vapor stream. The reactor vessel 32 may at least partially contain the disengaging vessel 26 and the disengaging vessel 26 is considered part of the reactor vessel 32. A collection chamber 34 in the reactor vessel 32 gathers the separated hydrocarbon vapor streams from the cyclones 30 for passage to an outlet nozzle 36 and eventually into a fractionation recovery zone (not shown). Diplegs 38 discharge catalyst from the cyclones 30 into a lower portion of the reactor vessel 32 that eventually passes the catalyst and adsorbed or entrained hydrocarbons into a stripping section 40 of the reactor vessel 32 across ports 42 defined in a wall of the disengaging vessel 26. Catalyst separated in the disengaging vessel 26 passes directly into the stripping section 40. The stripping section 40 contains baffles 43, 44 or other equipment to promote mixing between a stripping gas and the catalyst. The stripping gas enters a lower portion of the stripping section 40 through a conduit to one or more distributors 46. The coked catalyst leaves the stripping section 40 of the reactor vessel 32 through a reactor catalyst conduit 48 and passes to the regenerator vessel 50 at a rate regulated by a control valve 52. The coked catalyst from the reactor vessel 32 usually contains carbon in an amount of from 0.2 to 2 wt-%, which is present in the form of coke. Although coke is primarily composed of carbon, it may contain from 3 to 12 wt-% hydrogen as well as sulfur and other materials.

The regenerator vessel 50 may be a bubbling bed type of regenerator as shown in FIG. 1. However, other regenerator vessels and other flow conditions may be suitable for the present invention. The reactor catalyst conduit 48 with an inlet 48a in downstream communication with the reactor vessel 32 may feed coked catalyst to a regenerator riser 54 to which air or other oxygen-containing combustion gas may be added through an outlet of a combustion gas line 55 via riser gas line 55a. It is also contemplated that other lift gases may be used to lift the coked catalyst up the regenerator riser 54. In the embodiment of FIG. 1, the coked catalyst descends the reactor catalyst conduit 48 to a bight which communicates with the regenerator riser 54. The coked catalyst bends around the bight as it is picked up by the lift gas from riser gas line 55a with an outlet in upstream communication with the regenerator riser 54. The coked catalyst then travels up the regenerator riser 54 and enters the regenerator vessel 50 through a coked catalyst inlet 56. Coked catalyst is delivered to a catalyst distributor 60 with an entrance 64 in downstream communication with the catalyst inlet 56 and the outlet from riser gas line 55a for distributing coked catalyst to the regenerator vessel 50. The regenerator riser 54 may terminate at a top head 62. The regenerator riser 54 is a portion of the reactor catalyst conduit 48 that is immediately upstream of the catalyst distributor 60 and is disposed below the catalyst distributor 60. The entrance 64 to a header 66 which may comprise a longitudinal pipe may be disposed below the top head 62. Additionally, the header 66 may be perpendicular to the regenerator riser 54. The catalyst distributor 60 comprises at least one and preferably a plurality of nozzles 68 communicating with the header for discharging catalyst into the regenerator vessel 50. The catalyst distributor 60 discharges coked catalyst in an embodiment from under a top surface of a dense catalyst bed 58, and the catalyst distributor 60 is preferably submerged in the bed below the top surface. Additionally, the catalyst distributor 60 is disposed in an eccentric position in the regenerator vessel 50 and radially projects catalyst into the dense catalyst bed 58 therefrom across the entire cross-section of the dense bed. The combustion gas in the regenerator riser 54 assists in the projection of the catalyst into the bed from catalyst distributor 60 and also provides oxygen for combustion requirements.

Oxygen-containing combustion gas, typically air, from combustion gas line 55 is primarily delivered to the regenerator vessel 50 by a combustion gas distributor 80 below the catalyst distributor 60. In an embodiment, combustion gas distributor 80 distributes most of the combustion gas to the regenerator vessel 50 and is fed by a distributor gas line 55b from combustion gas line 55 regulated by a control valve. Flutes 82 in the combustion gas distributor 80 are arranged to emit combustion gas equally to the entire cross section of the regenerator vessel 50. The oxygen in the combustion gas contacts the coked catalyst and combusts carbonaceous deposits from the catalyst to regenerate the catalyst and generate flue gas. Catalyst may get entrained with flue gas ascending in the regenerator vessel 50. The catalyst entrained in the flue gas will therefore enter cyclone separators 86, 88 which centripetally separate flue gas from heavier catalyst particles. Catalyst particles will fall down dip legs 87, 89 and enter dense catalyst bed 58 again. Cleaned flue gas will ascend from the cyclone separators 86, 88 through ducts into plenum 90 and discharge through flue gas outlet 92. Regenerated catalyst will depart the dense catalyst bed 58 in the regenerator vessel 50 through a regenerated catalyst outlet 96. Regenerated catalyst conduit 12 in downstream communication with the outlet 96 delivers regenerated catalyst back to the reactor riser 20 at a rate regulated by control valve 14.

Combustion gas such as air may be used to lift coked catalyst up the regenerator riser 54 which may allow regeneration to occur within the regenerator riser. The combustion gas to the regenerator riser 54 may be 10-20 wt-% of combustion gas to the regenerator vessel 50. If air is the combustion gas, typically 13-15 kg (lbs) of air is required per kilogram (pound) of coke fed on catalyst to the regenerator. The temperature of the regenerator vessel 50 is about 500 to 900° C. and usually about 600 to 750° C. Pressure in the regenerator vessel 50 is preferably 173 to 414 kPa (gauge) (25 to 60 psig). The superficial velocity of the combustion gas is typically less than 1.2 m/s (4.2 ft/s) and the density of the dense bed is typically greater than 320 kg/m$^3$ (20 lb/ft$^3$) depending on the characteristics of the catalyst.

Figure 2:
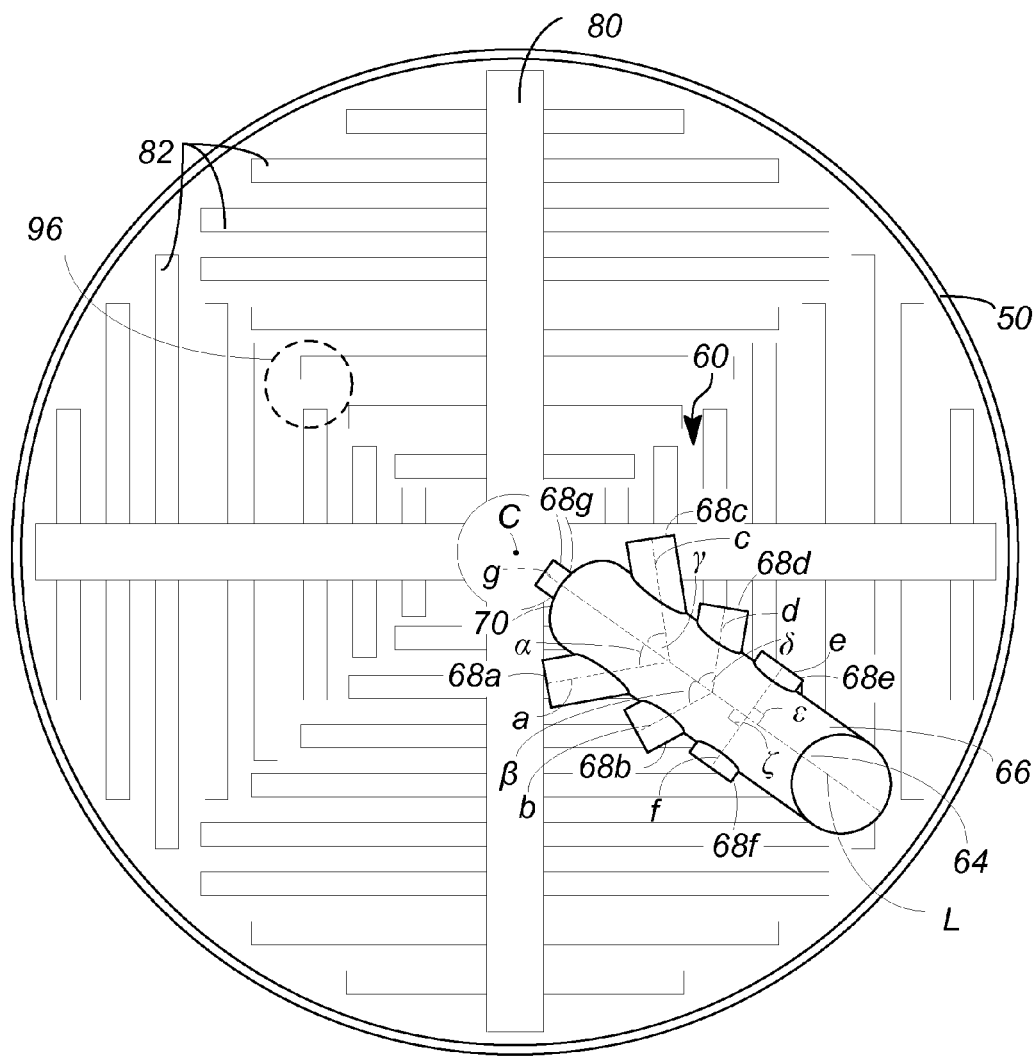
FIG. 2 is a plan view of the regenerator vessel of FIG. 1 showing the catalyst distributor of the present invention.

A plan view of the catalyst distributor 60 is shown in FIG. 2 above air distributor 80 and the flutes 82 thereof. The header 66 defines a longitudinal axis L and an angular nozzle 68a in downstream communication with the header 66. The angular nozzle 68a defines an acute angle α with the longitudinal axis L of the header 66. In other words, a longitudinal axis a defined by the angular nozzle 68a defines an acute angle α with the longitudinal axis L. The angular nozzle 68a discharges catalyst into the regenerator vessel 50 at an acute angle α to the longitudinal axis L. In an embodiment, a plurality of nozzles 68a-d in downstream communication with the header 66 each have an axis that defines an acute angle with longitudinal axis L. The nozzles 68b-d define acute angles β, γ and δ with the longitudinal axis L of the header 66, respectively. In other words, longitudinal axes a-d defined by the nozzles 68a-d define acute angles with the longitudinal axis L. The plurality of nozzles 68a-d discharge catalyst into the regenerator vessel 50 at an acute angle to the longitudinal axis L. A proximate nozzle 68e is perpendicular to the longitudinal axis L. Similarly, a proximate nozzle 68f is perpendicular to the longitudinal axis L. In other words, longitudinal axes e and f defined by the nozzles 68e and f each define right angles ε, ζ with the longitudinal axis L. Nozzles 68a, b and f are one side of the header 66 and nozzles c, d and e are on the opposite side of the header 66. Nozzles directly opposed to each other may have the same length and define the same angle with the longitudinal axis L. In an embodiment angular nozzles on the same side of the header 66 define angles α and β and δ with longitudinal axis L that are each different. The catalyst distributor may include a distal nozzle 68g on the outer end 70 of the header 66 that defines a longitudinal axis g that is aligned with the longitudinal axis L.

In an embodiment, the smallest angles the nozzles 68a-g define with the longitudinal axis L successively decrease as the nozzles are positioned further away from the entrance 64 and closer to the outer end 70. The nozzles discharge catalyst at angles to the longitudinal axis L at angles that successively decrease as the distance from the inlet end increases. This allows the nozzles to radially project catalyst in equal portions across the entire cross section of the bed from an eccentric position in the regenerator vessel 50. Additionally, in an embodiment, the length of the nozzles 68a-f on both sides of the header 66 successively increase as the nozzles are positioned further away from the entrance 64 and closer to the outer end 70. The catalyst distributor 60 is disposed in one quadrant of the cross section of the regenerator vessel 50 and the longitudinal axis L may intersect a sectional center C of the regenerator vessel 50. The opposite position of outlet 96 relative to the distributor 60 is also seen in FIG. 2 in which outlet 96 is disposed in a quadrant opposed to the quadrant containing the distributor 60.

Figure 3:
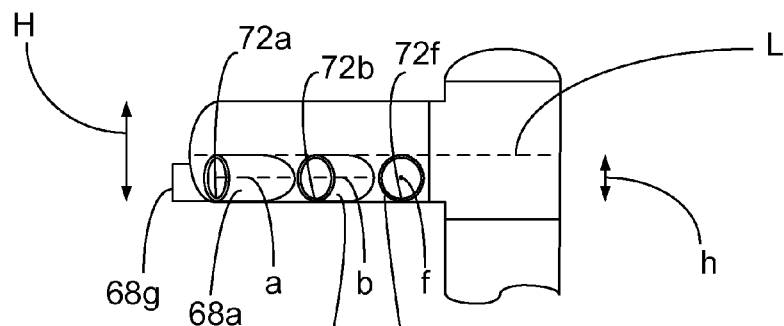
FIG. 3 is an enlarged partial side view of the catalyst distributor of the present invention.

FIG. 3 provides an enlarged, partial elevational view of the catalyst distributor 60 with the header 66 defining a height H. A bottom 72a of the nozzle 68a is disposed in the bottom quarter of the height H of the header 66. In an embodiment, the bottom 72a is defined as the lowest point of the inner circumference of the nozzle 68a. The positioning of the nozzle 68a with respect to the header 66 assures no catalyst stagnates in the header 66. The nozzle 68a also has a height h. In an embodiment, over 50% of the height h of the nozzle 68a is disposed below 50% of a height H of the header 66. FIG. 3 also illustrates that longitudinal axis a defined by the nozzle 68a is horizontal in an embodiment. In an embodiment, the longitudinal axis L of the header 66 is also horizontal. In a further embodiment, bottoms 72a-f of all the nozzles 68a-f are disposed in the bottom quarter of the height H of the header 66, but only nozzles 68a, b and f are shown in FIG. 3. In an embodiment, the bottoms 72a-f are defined as the lowest point of the inner circumference of the nozzle 68a-f. In an embodiment, all the nozzles 68a-f have heights h and over 50% of a height h of the nozzles 68a-f are disposed below 50% of a height H of the header 66. In an additional embodiment, the longitudinal axes define by all the nozzles 68a-f are horizontal, although only 68a, b and f are shown in FIG. 3. Aligned distal nozzle 68g is also shown in FIG. 3. Distal nozzle 68g also has an axis g which is horizontal and aligned with axis L. The horizontal nozzles 68a-g discharge catalyst horizontally from header 66.

Figure 4:
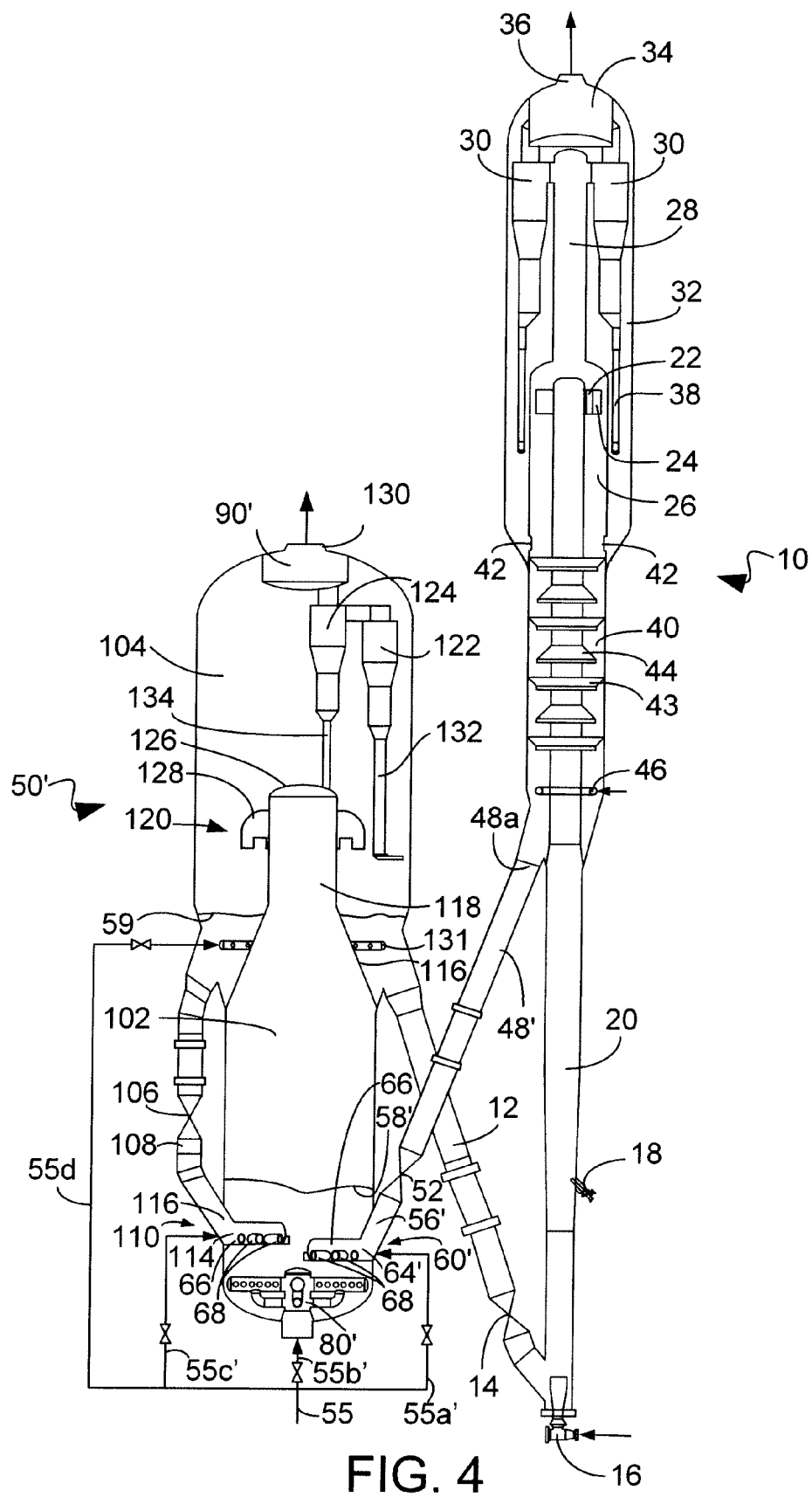
FIG. 4 is a schematic, elevational view of an alternative FCC unit incorporating an additional embodiment of catalyst distributor of the present invention.

FIG. 4 shows an embodiment in a regenerator vessel 50' that is a combustor type of regenerator, which may use hybrid turbulent bed-fast fluidized conditions in a high-efficiency regenerator vessel 50' for completely regenerating coked catalyst. Elements in FIG. 4 with the same configuration as in FIG. 1 will have the same reference numeral as in FIG. 1. Elements in FIG. 4 which have a different configuration as the corresponding element in FIG. 1 will have the same reference numeral but designated with a prime symbol ('). The configuration and operation of the reactor section 10 in FIG. 4 is essentially the same as in to FIG. 1 and the foregoing description is incorporated by reference into the embodiment of FIG. 4. However, the reactor catalyst conduit 48' communicates with a catalyst distributor 60'. An inlet 48a of the reactor catalyst conduit 48' is in communication with the reactor vessel 32. A predominant portion of the reactor catalyst conduit 48' is disposed above the catalyst distributor 60'. A fluidizing gas which may be a combustion gas is provided by fluidizing gas line 55a' to propel the coked catalyst through the catalyst distributor 60'. However, relatively less fluidizing gas from fluidizing gas line 55a' is required than in the embodiment of FIG. 1 because gravity assists in the transport of coked catalyst in reactor catalyst conduit 48' since the portion of the reactor catalyst conduit 48' immediately upstream the catalyst distributor 60' is disposed above the catalyst distributor 60'. Coked catalyst regulated by control valve 52 descends the reactor catalyst conduit 48' and enters a lower or first chamber 102 of the combustor regenerator vessel 50' through catalyst inlet 56'.

The catalyst distributor 60' with an entrance 64' in downstream communication with the catalyst inlet 56' and the outlet from fluidizing gas line 55a' distributes coked catalyst to the lower chamber 102 of combustor regenerator vessel 50'. The entrance 64' communicates with a header 66 which may define a longitudinal axis. Additionally, the header 66 may be angular to the immediately upstream portion of the reactor catalyst conduit 48'. The catalyst distributor 60' comprises at least one and preferably a plurality of nozzles 68 communicating with the header 66 for discharging catalyst into the lower chamber 102 of the regenerator vessel 50'. The catalyst distributor 60' discharges coked catalyst in an embodiment from under a top surface of a dense catalyst bed 58', and the catalyst distributor 60' is preferably submerged in the bed below the top surface. Additionally, the catalyst distributor 60' is disposed in an eccentric position in the combustor regenerator vessel 50' and radially projects catalyst into the dense catalyst bed 58' therefrom across the entire cross-section of the dense bed. The fluidizing gas from the fluidizing gas line 55a' assists in the projection of the catalyst into the bed from catalyst distributor 60'. If the fluidizing gas contains oxygen to provide oxygen for combustion requirements, fluidizing gas line 55a' may be a branch from combustion gas line 55'. The header 66 and nozzles 68 of catalyst distributor 60' are configured as described with respect to FIGS. 1-3.

A combustion gas distributor 80' distributes gas from distributor gas line 55b' to the lower chamber 102. Combustion gas line 55' may feed the distributor gas line 55b'. The combustion gas contacts coked catalyst entering from catalyst distributor 60' and lifts the catalyst at a superficial velocity of combustion gas in the lower chamber 102 of at least 1.1 m/s (3.5 ft/s) under fast fluidized flow conditions. In an embodiment, flow conditions in the lower chamber 102 will include a catalyst density of from 48 to 320 kg/m$^3$ (3 to 20 lb/ft$^3$) and a superficial gas velocity of 1.1 to 2.2 m/s (3.5 to 7 ft/s). In an embodiment, to accelerate combustion of the coke in the lower chamber 102, hot regenerated catalyst from a dense catalyst bed 59 in an upper or second chamber 104 may be recirculated into the lower chamber 102 via an external recycle catalyst conduit 108 regulated by a control valve 106. Hot regenerated catalyst enters an inlet of recycle catalyst conduit 108 which is in downstream communication with the upper chamber 104. The outlet end of the recycle catalyst conduit may be in upstream communication with a catalyst distributor 110 in the lower chamber 102. Although described differently herein, it is contemplated that recycle catalyst could be added to the lower chamber 102 without using a catalyst distributor 110. It is also contemplated that recycle catalyst could be added to the lower chamber 102 using the catalyst distributor 110 but the coked catalyst in reactor catalyst conduit 48 be added without distributor 60'. The hot regenerated catalyst may enter the lower chamber 102 through the second catalyst distributor that may be disposed at a higher height than catalyst distributor 60'. The catalyst distributors 60' and 110 are preferably disposed on opposite sides of the regenerator vessel 50'. Recirculation of regenerated catalyst, by mixing hot catalyst from the dense catalyst bed 59 with relatively cool coked catalyst from the reactor catalyst conduit 48' entering the lower chamber 102, raises the overall temperature of the catalyst and gas mixture in the lower chamber 102. A predominant portion of the recycle catalyst conduit 108 and a portion of recycle catalyst conduit 108 immediately upstream of the distributor 110 is disposed above the catalyst distributor 110.

The catalyst distributor 110 with an entrance 114 in downstream communication with a catalyst inlet 116 and an outlet from recycle gas line 55c distributes recycled regenerated catalyst to the lower chamber 102 of combustor regenerator vessel 50'. If the recycle gas contains oxygen it may be a branch from combustion gas line 55. The entrance 114 communicates with a header 66 which may comprise a longitudinal axis. Additionally, the header 66 may be angular to the immediately upstream portion of the recycle catalyst conduit 108. The catalyst distributor 110 comprises at least one and preferably a plurality of nozzles 68 communicating with the header 66 for discharging catalyst into the combustor regenerator vessel 50'. The catalyst distributor 110 discharges catalyst in an embodiment to from under a top surface of a dense catalyst bed 58', and the catalyst distributor 110 is preferably submerged in the bed below the top surface. Additionally, the catalyst distributor 110 is disposed in an eccentric position in the lower chamber 102 of the combustor regenerator vessel 50' and radially projects catalyst into the dense catalyst bed 58' therefrom preferably across the entire cross-section of the dense bed. The recycle gas from the catalyst distributor 110 assists in the projection of the catalyst into the bed from catalyst distributor 110 and may also provide oxygen for combustion requirements. The header 66 and nozzles 68 of the catalyst distributor 110 are configured as described with respect to FIGS. 1-3.

The mixture of catalyst and combustion gas in the lower chamber 102 ascend through a frustoconical transition section 116 to the transport, riser section 118 of the lower chamber 102. The riser section defines a tube and extends upwardly from the lower chamber 102. The mixture of catalyst and gas travels at a higher superficial gas velocity than in the lower chamber 102 due to the reduced cross-sectional area of the riser section 118 relative to the cross-sectional area of the lower chamber 102 below the transition section 116. Hence, the superficial gas velocity will usually exceed about 2.2 m/s (7 ft/s). The riser section 118 will have a relatively lower catalyst density of less than about 80 kg/m$^3$ (5 lb/ft$^3$).

The mixture of catalyst particles and flue gas is discharged from an upper portion of the riser section 118 into the upper chamber 104. Substantially completely regenerated catalyst may exit the top of the riser section 118, but arrangements in which partially regenerated catalyst exits from the lower chamber 102 are also contemplated. Discharge is effected through a disengaging device 120 that separates a majority of the regenerated catalyst from the flue gas. Initial separation of catalyst upon exiting the riser section 118 minimizes the catalyst loading on cyclone separators 122, 124 or other downstream devices used for the essentially complete removal of catalyst particles from the flue gas, thereby reducing overall equipment costs. In an embodiment, catalyst and gas flowing up the riser section 118 impact a top elliptical cap 126 of the riser section 118 and reverse flow. The catalyst and gas then exit through downwardly directed openings in radial disengaging arms 128 of the disengaging device 120. The sudden loss of momentum and downward flow reversal cause at least about 70 wt-% of the heavier catalyst to fall to the dense catalyst bed 59 and the lighter flue gas and a minor portion of the catalyst still entrained therein to ascend upwardly in the upper or second chamber 104. Downwardly falling, disengaged catalyst collects in the dense catalyst bed 59. Catalyst densities in the dense catalyst bed 59 are typically kept within a range of from about 640 to about 960 kg/m$^3$ (40 to 60 lb/ft$^3$).

A fluidizing gas line 55d delivers fluidizing gas to the dense catalyst bed 59 through a fluidizing distributor 131. Fluidizing gas may be combustion gas, typically air, and may branch from combustion gas line 55. In combustor regenerator vessel 50', in which full combustion of coke is effected in the lower chamber 102, approximately no more than 2 wt-% of the total gas requirements within the process enters the dense catalyst bed 59 through the fluidizing distributor 131 with the remainder being added to the lower chamber 102. In this embodiment, gas is added to the upper chamber 104 not for combustion purposes, but only for fluidizing purposes, so the catalyst will fluidly exit through the catalyst conduits 108 and 12. Combustion gas added via gas lines 55a' and 55c' will account for about 10-20 wt-% of the gas to the combustor regenerator vessel 50'. If air is the combustion gas, typically 13 to 15 kg (lbs) of air is required per kilogram (pound) of coke fed on catalyst to the regenerator. The combustor regenerator vessel 50' typically has a temperature of about 594 to about 704° C. (1100 to 1300° F.) in the lower chamber 102 and about 649 to about 760° C. (1200 to 1400° F.) in the upper chamber 104. Pressure may be between 173 and 414 kPa (gauge) (25 to 60 psig) in both chambers.

The combined flue and fluidizing gas and entrained particles of catalyst enter one or more separation means, such as the cyclone separators 122, 124, which separates catalyst fines from the gas. Flue gas, relatively free of catalyst is withdrawn from the combustor regenerator vessel 50' through an exit conduit 130 while recovered catalyst is returned to the dense catalyst bed 59 through respective diplegs 132, 134. Catalyst from the dense catalyst bed 59 is transferred through the regenerated catalyst conduit 12 back to the reactor section 10 where it again contacts feed as the FCC process continues.

Figure 5:
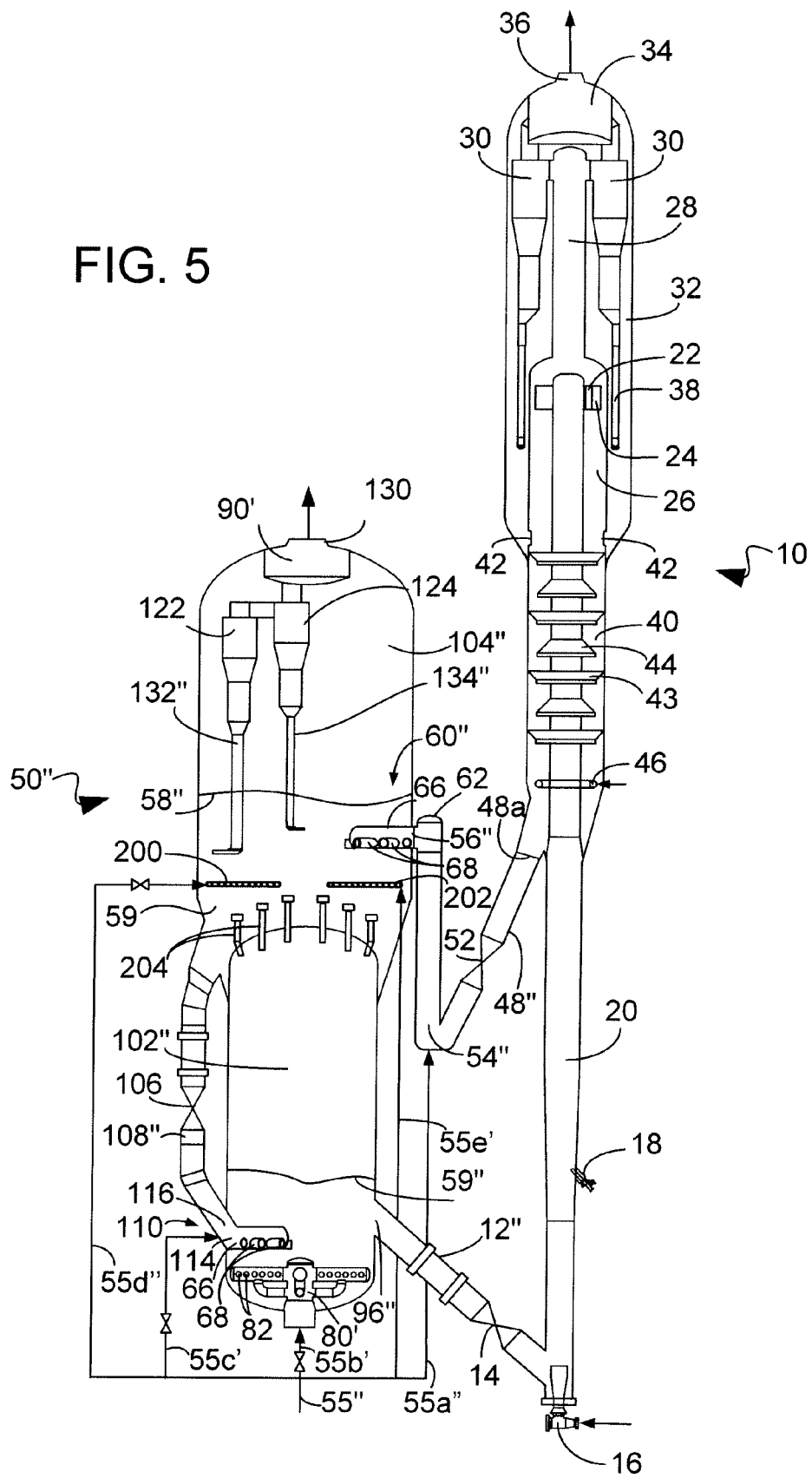
FIG. 5 is a schematic, elevational view of an alternative FCC unit incorporating a further embodiment of catalyst distributor of the present invention.

FIG. 5 shows an embodiment in a regenerator vessel 50" that is a two-stage bubbling bed regenerator, which may be suitable in an FCC unit that processes heavier feed such as a resid unit. Elements in FIG. 5 with the same configuration as in FIG. 1 or 4 will have the same reference numeral as in FIG. 1 or 4. Elements in FIG. 5 which have a different configuration as the corresponding element in FIG. 1 or 4 will have the same reference numeral but designated with a double prime symbol ("). The configuration and operation of the reactor section 10 in FIG. 5 is essentially the same as in FIG. 1 and the foregoing description is incorporated by reference into the embodiment of FIG. 5. The reactor catalyst conduit 48" with an inlet 48a in downstream communication with the reactor vessel 32 may feed coked catalyst to a regenerator riser 54" at a rate regulated by control valve 52. Lift gas pushes the catalyst up the regenerator riser. If air or other oxygen-containing combustion gas is used as the lift gas, it may be added from an outlet of a riser gas line 55a" branching from a combustion gas line 55". The reactor catalyst conduit 48" has an outlet that communicates with a catalyst distributor 60" in an upper chamber 104" of the regenerator vessel 50". The fluidizing gas which may be a combustion gas propels the coked catalyst through the catalyst distributor 60". In the embodiment of FIG. 5, the coked catalyst descends the reactor catalyst conduit 48" to a bight which communicates with the regenerator riser 54". The coked catalyst bends around the bight as it is picked up by the lift gas from gas line 55a" with an outlet in upstream communication with the regenerator riser 54". The coked catalyst then travels up the regenerator riser 54" and enters the upper chamber 104" of the regenerator vessel 50" through a coked catalyst inlet 56". It is also contemplated that coked catalyst may first enter the lower chamber of a two-stage regenerator if a two-stage generator were ever designed so. The catalyst distributor 60" with an entrance which may be in downstream communication with the catalyst inlet 56" and the outlet from riser gas line 55a" distributes coked catalyst to the upper chamber 104" of the regenerator vessel 50". In the embodiment of FIG. 5, the entrance to the catalyst distributor 60" and the catalyst inlet to the regenerator vessel 50" may be coterminous. The regenerator riser 54" may terminate at a top head 62. The regenerator riser 54" is a portion of the reactor catalyst conduit 48" that is immediately upstream of the catalyst distributor 60" and is disposed below the catalyst distributor 60". A header 66 may comprise a longitudinal pipe that may be disposed below the top head 62. Additionally, the header 66 may be perpendicular to the regenerator riser 54". The catalyst distributor 60" comprises at least one and preferably a plurality of nozzles 68 communicating with the header for discharging catalyst into the upper chamber 104" of the regenerator vessel 50". The catalyst distributor 60" discharges coked catalyst in an embodiment from under a top surface of a dense catalyst bed 58", and the catalyst distributor 60" is preferably submerged in the bed below the top surface. Additionally, the catalyst distributor 60" is disposed in an eccentric position in the upper chamber 104" of the regenerator vessel 50" and radially projects catalyst into the dense catalyst bed 58" therefrom across the entire cross-section of the dense bed. The lift gas in the regenerator riser 54 assists in the projection of the catalyst into the bed from catalyst distributor 60 and may also provide oxygen for combustion requirements. The header 66 and nozzles 68 of catalyst distributor 60" are configured as described with respect to FIGS. 1-3.

Oxygen-containing combustion gas, typically air, from combustion gas line branches 55d" and 55e of combustion gas line 55" regulated by control valves are primarily distributed to the upper chamber 104" of the regenerator vessel 50" by combustion gas distributors 200 and 202, respectively, below the catalyst distributor 60". In an embodiment, combustion gas distributors 200, 202 distribute most of the combustion gas to the upper chamber. The oxygen in the combustion gas contacts the coked catalyst and combusts most of the carbonaceous deposits from the catalyst to regenerate the catalyst and generate flue gas. Catalyst may get entrained with flue gas ascending in the upper chamber 104". The catalyst entrained in the flue gas will therefore enter cyclone separators 122", 124" which centripetally separate flue gas from heavier catalyst particles. Catalyst particles will fall down dip legs 132", 134" and enter dense catalyst bed 58" again. The ends of the dip legs 132", 134" may be submerged in the dense catalyst bed 58". Cleaned flue gas will ascend from the cyclone separators 122", 124" through ducts into plenum 90' and discharge through flue gas outlet 130. Partially regenerated catalyst will depart the dense catalyst bed 58" through a transport catalyst conduit 108" regulated by control valve 106 and enter lower chamber 102".

Hot partially regenerated catalyst enters an inlet of recycle catalyst conduit 108 which is in downstream communication with the upper chamber 104". The outlet end of the transport catalyst conduit 108" may be in upstream communication with a catalyst distributor 110 in the lower chamber 102". The hot partially regenerated catalyst enters the lower chamber 102" through the second catalyst distributor 110. A predominant and immediately upstream portion of the transport catalyst conduit 108" is disposed above the catalyst distributor 110.

The catalyst distributor 110 with an entrance 114 in downstream communication with a catalyst inlet 116 and an outlet from recycle gas line 55c' distributes recycled regenerated catalyst to the lower chamber 102" of the regenerator vessel 50". The entrance 114 communicates with a header 66 which may comprise a longitudinal axis. Additionally, the header 66 may be angular to an immediate upstream portion of the transport catalyst conduit 108". The catalyst distributor 110 comprises at least one and preferably a plurality of nozzles 68 communicating with the header 66 for discharging catalyst into the combustor lower chamber 102" of the regenerator vessel 50". The catalyst distributor 110 discharges coked catalyst in an embodiment from under a top surface of a dense catalyst bed 58', and the catalyst distributor 110 is preferably submerged in the bed below the top surface. Additionally, the catalyst distributor 110 is disposed in an eccentric position in the regenerator vessel 50" and radially projects catalyst into the dense catalyst bed 59" therefrom across the entire cross-section of the dense bed. The gas from the recycle gas line 55c' assists in the projection of the catalyst into the bed from catalyst distributor 110 and may also provide oxygen for combustion requirements. The header 66 and nozzles 68 of catalyst distributor 110 are configured as described with respect to FIGS. 1-3. Catalyst distributor 110 and catalyst distributor 60" may be on opposite sides of the regenerator vessel 50".

Combustion gas distributor 80' fed by distributor gas line 55b' branching from combustion gas line 55" distributes most of the combustion gas to the lower chamber 102". Flutes 82 in the combustion gas distributor 80 are arranged to emit combustion gas equally to the entire cross section of the lower chamber 102" of the regenerator vessel 50". The oxygen in the combustion gas contacts the coked catalyst and combusts most of the remaining carbonaceous deposits from the catalyst to regenerate the catalyst and generate flue gas. Catalyst may get entrained with flue gas and ascend in the lower chamber 102" and exit through vents 204 into the upper chamber 104". Partially regenerated catalyst entering the lower chamber 102" is fully regenerated by any combustion gas from the catalyst distributor 110 and the combustion gas distributor 80'.

A regenerated catalyst outlet 96" from the lower chamber 102" of the regenerator vessel 50" allows fully regenerated catalyst to depart through a regenerated catalyst conduit 12". Regenerated catalyst conduit 12" in downstream communication with said outlet 96" delivers regenerated catalyst back to the reactor riser 20 at a rate regulated by control valve 14.

Combustion gas such as air may be used to lift coked catalyst up the regenerator riser 54" which may allow regeneration to occur within the regenerator riser. The combustion gas to the regenerator riser 54 may be 10-20 wt-% of combustion gas to the regenerator vessel 50. If air is the combustion gas, typically 11-13 kg (lbs) of air is required per kilogram (pound) of coke fed on catalyst to the regenerator 50" in the upper chamber 104" and about 2-4 kg (lbs) of air is required per kilogram (pound) of coke fed on catalyst to the regenerator 50" in the lower chamber 102". Seventy-five weight percent of all combustion gas requirements are fed to the upper chamber 104". Twenty-five weight percent of all combustion gas requirements are fed to the lower chamber with about 6 to 10 wt-% entering the upper chamber 104" from the lower chamber 102" through vents 204. The two-stage regenerator vessel 50" typically has a temperature of about 594 to about 760° C. (1100 to 1400° F.) in both the lower chamber 102" and the upper chamber 104". In both chambers, the superficial velocity of the combustion gas is typically less than 1.2 m/s (4.2 ft/s) and the density of the dense bed is typically greater than 320 kg/m$^3$ (20 lb/ft$^3$) depending on the characteristics of the catalyst. Pressure may be between 173 and 414 kPa (gauge) (25 to 60 psig) in both chambers.

The embodiment of FIG. 5 provides for the reactor section 10 to be disposed at a lower relative height while maintaining a similar downward angle for reactor catalyst conduit 48" as in FIGS. 1 and 4 despite that the outlet end of the reactor catalyst conduit 48" is disposed at a higher elevation in the upper chamber 104".

The catalyst distributor 60, 60', 60" and 110 will typically be supported by the end of the catalyst conduit with which it communicates. The catalyst distributor 60, 110 will typically be made of stainless steel such as 304 stainless steel, and coated with abrasion resistant lining both externally and internally. The regenerator may be equipped with one or more catalyst coolers to avoid excessively hot regenerator temperatures.

EXAMPLE 1

The catalyst distributor of the present invention was tested in a FCC regenerator by injecting radioactive sodium-24 liquid into various locations, which allowed monitoring of its progression through the catalyst bed of the regenerator. The sodium isotope was injected into the regenerator in an aqueous-soluble form. Once injected, the liquid component flashed due to the high process temperature, causing the radioactive sodium isotope to adhere to the catalyst. Detectors around the circumference of the regenerator vessel monitored catalyst distribution and flow characteristics in the solid phase.

Figure 6:
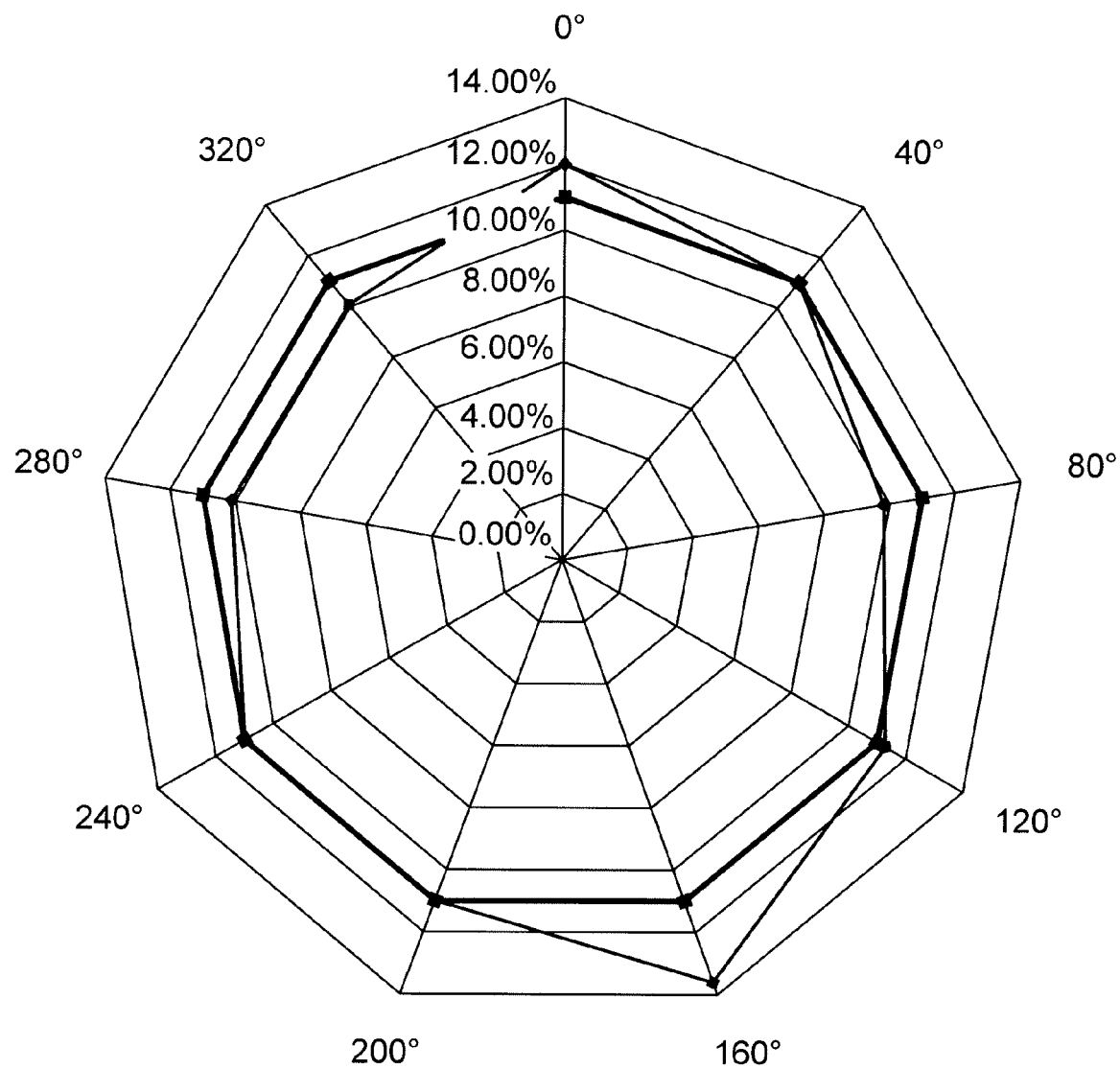
FIG. 6 is a radar plot of catalyst distribution provided by the present invention.

FIG. 6 presents the distribution analysis of catalyst in the regenerator in the form of a radar plot. The catalyst distributor was disposed just counter-clockwise of the radial line at 240 degrees and its longitudinal axis was aimed toward a center of the vessel. A catalyst outlet was disposed between the center and the outer wall of the regenerator vessel on the radial line at about 40 degrees. Actual catalyst distribution data is indicated by the smaller diamonds. The ideal catalyst distribution profile is indicated by the larger squares for comparison. The scale percentages indicate relative flow of spent catalyst to the particular detector location.

The detector ring revealed responses similar to ideal distribution all around the circumference of the regenerator vessel. Consequently, the catalyst distributor of the present invention provides a good catalyst distribution relative to the ideal distribution profile for uniformly exposing catalyst to combustion gas.

EXAMPLE 2

We compared actual performance of an FCC regenerator before and after installation of the spent catalyst distributor of the present invention. Regenerator conditions were kept the same except less CO promoter was used in the catalyst after installation of the catalyst distributor.

We found that the greatest temperature differential across a diameter of the regenerator vessel diminished from about 38° C. (100° F.) to about 4° C. (40° F.) as a result of installing the catalyst distributor of the present invention. This indicates that less after burn is occurring due to the improved spent catalyst distribution in the regenerator. Similarly, we found nitrous oxide emissions in the flue gas decreased from about 80 wppm to about 35 wppm after installing the catalyst distributor of the present invention also due to the improved catalyst distribution.

The invention claimed is:

1. A process for combusting coke from catalyst comprising:
    delivering coked catalyst to a catalyst distributor having a header defining a longitudinal axis;
    discharging catalyst horizontally from nozzles in said header of said catalyst distributor from under a top surface of a dense catalyst bed into a regenerator vessel at an acute angle to said longitudinal axis;
    delivering combustion gas to said regenerator vessel for combusting coke from said catalyst to produce flue gas and regenerated catalyst;
    separating said flue gas from said regenerated catalyst;

discharging regenerated catalyst from said regenerator vessel; and discharging flue gas from said regenerator vessel.

2. The process of claim 1 further including discharging catalyst from said catalyst distributor through nozzles with a lowest point of an inner circumference of the nozzles disposed in a lower quarter of a height of said header.

3. The process of claim 1 wherein said catalyst distributor is disposed below said top surface.

4. The process of claim 1 wherein said catalyst distributor discharges catalyst from an eccentric position in said regenerator vessel.

5. The process of claim 1 wherein said catalyst distributor discharges catalyst and combustion gas.

6. The process of claim 1 wherein said catalyst distributor has an inlet end and discharges catalyst at angles to said longitudinal axis, said angles successively decrease as the distance from the inlet end increases.

7. A process for fluid catalytic cracking comprising:
contacting hydrocarbon feed with catalyst to produce cracked products and coked catalyst;
separating said cracked products from said coked catalyst;
delivering coked catalyst to a catalyst distributor having a header defining a longitudinal axis;
discharging catalyst horizontally from nozzles in said header of said catalyst distributor from under a top surface of a dense catalyst bed into a regenerator vessel at an acute angle to said longitudinal axis;
delivering combustion gas to said regenerator vessel for combusting coke from said coked catalyst to produce flue gas and regenerated catalyst;
separating said flue gas from said regenerated catalyst;
discharging regenerated catalyst from said regenerator vessel; and
discharging flue gas from said regenerator vessel.

8. The process of claim 7 further including discharging catalyst from said catalyst distributor through nozzles with a lowest point of an inner circumference of the nozzles disposed in a lower quarter of a height of said header.

9. The process of claim 7 wherein said catalyst distributor discharges catalyst from an eccentric position in said regenerator vessel.

10. The process of claim 7 wherein said catalyst distributor discharges catalyst and combustion gas.

11. The process of claim 7 wherein said catalyst distributor has an inlet end and discharges catalyst at angles to said longitudinal axis, said angles successively decrease as the distance from the inlet end increases.

12. The process of claim 7 further including lifting coked catalyst to said catalyst distributor from a lower position by a lift gas.

13. The process of claim 12 further including transporting coked catalyst downwardly in a conduit before said lifting step.

14. The process of claim 12 further including lifting coked catalyst to said catalyst distributor in an upper chamber of said regenerator vessel.

15. The process of claim 7 further including transporting coked catalyst downwardly in a conduit to said catalyst distributor.

16. A process for combusting coke from catalyst comprising:
delivering coked catalyst to a catalyst distributor having a header defining a longitudinal axis;
discharging catalyst from said catalyst distributor from under a top surface of a dense catalyst bed horizontally through nozzles with a lowest point of an inner circumference of the nozzles disposed in a lower quarter of a height of said header into a regenerator vessel at an acute angle to said longitudinal axis;
delivering combustion gas to said regenerator vessel for combusting coke from said catalyst to produce flue gas and regenerated catalyst;
separating said flue gas from said regenerated catalyst;
discharging regenerated catalyst from said regenerator vessel; and
discharging flue gas from said regenerator vessel.

\* \* \* \* \*